(12) United States Patent
Hayashi

(10) Patent No.: US 6,294,783 B1
(45) Date of Patent: Sep. 25, 2001

(54) INFRARED SENSOR

(75) Inventor: Kooji Hayashi, Hakui (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/168,021

(22) Filed: Oct. 7, 1998

(30) Foreign Application Priority Data

Oct. 7, 1997 (JP) .................................................. 9-291538

(51) Int. Cl.$^7$ .................................................. G01J 5/34
(52) U.S. Cl. .................................. 250/338.3; 250/338.4; 250/334
(58) Field of Search ........................ 250/338.3, 338.4, 250/334

(56) References Cited

U.S. PATENT DOCUMENTS

| 4,626,687 | 12/1986 | Nara et al. ........................... 250/338 |
| 5,352,895 | 10/1994 | Inoue . | |

FOREIGN PATENT DOCUMENTS

| 19616549 | 9/1997 | (DE) . |
| 0145457 | 6/1985 | (EP) . |
| 0362050 | 4/1990 | (EP) . |
| 0781982 | 7/1997 | (EP) . |
| 60125530 | 7/1985 | (JP) . |
| 6137941 | * 5/1994 | (JP) ................................ 250/338.4 |

OTHER PUBLICATIONS

Austrian Patent Office Search Report issued Mar. 30, 2000 in connection with a related application filed in Singapore.
Patent Abstracts of Japan, publication No. 08166906 A, dated Jun. 25, 1996 and JP 63–09200 filed Dec. 13, 1994, Kyogo, Suzuki.
Austrian Patent Office Search Report issued Jun. 25, 1999 in connection with a related application filed in Singapore.

* cited by examiner

*Primary Examiner*—Constantine Hannaher
*Assistant Examiner*—Andrew Israel
(74) *Attorney, Agent, or Firm*—Ostrolenk, Faber, Gerb & Soffen, LLP

(57) ABSTRACT

An infrared sensor has a stem with a metallic base serving as a ground and a ground terminal extending from the metallic base; a substrate disposed on the metallic base; a field effect transistor attached to the substrate; a pyroelectric element connected between the gate of the field effect transistor and ground; and a capacitor connected between ground and either the drain terminal or the source terminal of the field effect transistor. One of the electrodes of the capacitor is directly connected to the metallic base of the stem, while the other electrode of the capacitor is directly connected to the corresponding terminal by a conductive bonding material.

17 Claims, 9 Drawing Sheets

INFRARED SENSOR

BACKGROUND OF THE INVENTION

1. Field of the Invention

The present invention relates to an infrared sensor and, more particularly, to a pyroelectric infrared sensor to be used in, for example, a burglar alarm or security system for the purpose of detecting a person.

2. Description of the Related Art

FIG. 11 is a circuit diagram showing the basic circuitry of an infrared sensor. The infrared sensor generally denoted by 1 has a pyroelectric element 2. The pyroelectric element 2 has, for example, a pyroelectric substrate and electrodes formed on both surfaces of the pyroelectric substrate. An example is described below in connection with FIG. 12. Thus, a pair of pyroelectric bodies polarized in opposite directions as indicated by arrows in FIG. 11 are connected in series to form the pyroelectric element. A resistor or equivalent resistance is connected in parallel with the series connection of the pyroelectric elements. The pyroelectric element 2 has one terminal connected to the gate G of a field effect transistor (FET) 3 and the other terminal connected to the ground GND. The drain D and the source S of the FET 3 serve as the input and output terminals of the infrared sensor 1.

In the operation of this infrared sensor 1, the pyroelectric element 2 supplied with thermal energy generates pyroelectric current that is output as a voltage through an impedance transformation effected by the resistor and the FET 3. The infrared sensor 1 is sensitive even to a very low intensity of infrared rays. The high sensitivity to small energy input, on the other hand, poses a problem in that the infrared sensor 1 is not stable against external noise. In particular, the infrared sensor 1 is liable to be affected by RF noise of frequencies ranging from 100 MHz to 2 GHz, resulting in malfunction. In order to eliminate such RF noise, Japanese Laid-Open Patent Publication No. 60-125530 discloses a circuit in which capacitors are connected between the drain D of the FET 3 and the ground GND and between the source S and the ground GND of the FET 3.

In general, an infrared sensor of the kind described can have a structure as illustrated in FIG. 12. The infrared sensor 1 has a stem 4 that serves also as a case. The stem 4 has a disk-shaped metallic base 4a and three terminals 4b, 4c and 4d extending from the metallic base 4a. The terminal 4d of these three terminals 4b, 4c, 4d is electrically connected to the metallic base 4a, while other terminals 4b, 4c are insulated from the metallic base 4a. These terminals 4b, 4c, 4d are formed so as to project upward above the metallic base 4a.

A substrate 5 rests on the metallic base 4a. Pattern electrodes 6a, 6b, 6c and 6d are formed on the upper surface of the substrate 5. Holes are formed in the portions of the substrate 5 where the pattern electrodes 6a, 6b, 6c are formed, and the aforesaid terminals 4a, 4b, 4c are received in these holes. The grounding terminal 4d is connected to the pattern electrode 6a, while the electrodes 4b and 4c are respectively connected to the pattern electrodes 6b and 6c.

To the pattern electrode 6d is connected the gate G of the FET 3, while the pattern electrodes 6b, 6c are connected to the drain D and the source S of the FET 3. Capacitors 7 are connected, respectively, between the pattern electrodes 6a and 6b and between the pattern electrodes 6a and 6c. A pyroelectric element 2 is connected to the pattern electrodes 6a and 6d, through supports 8 made of an electrically conductive material. The described structure is capped with a cap 9 that has an infrared-transmissive filter.

In this infrared sensor 1, RF noise is removed by the capacitors 7 connected between the drain D of the FET 3 and the ground GND and between the source S of the FET 3 and the ground GND, whereby malfunctioning attributable to the RF noise is suppressed.

However, resistance and inductance are generated in the pattern electrodes and terminals on the substrate. Similarly, resistance and inductance are formed also in the grounding terminal, between the metallic base and the substrate. Consequently, the infrared sensor 1 has a circuit as shown in FIG. 13 that fails to stably remove RF noise due to resistance and inductance generated in the pattern electrodes and the terminals.

It is also to be noted that reduction in size of the substrate is not easy because of the necessity of providing the capacitors on the substrate. Moreover, the use of the capacitors raises the cost. For these reasons, the anti-noise measure employing capacitors can be used only for certain types of products that tolerate high price.

For the foregoing reasons, there is a need for an inexpensive infrared sensor that can stably remove RF noise and that is easy to miniaturize.

SUMMARY OF THE INVENTION

The present invention is directed to an infrared sensor which satisfies the aforementioned need. The infrared sensor comprises: a stem having a metallic base serving as a ground and a terminal extending from the metallic base; a substrate disposed on the metallic base; a field effect transistor attached to the substrate; a pyroelectric element connected between the gate of the field effect transistor and the ground; and a capacitor connected between ground and either or both of the drain terminal and the source terminal of the field effect transistor. One of the electrodes of the capacitor is directly connected to the metallic base of the stem, while the other electrode of the capacitor is directly connected to the respective terminal by a conductive bonding material.

In this infrared sensor, the arrangement may be such that one of the electrodes of the capacitor is connected to a flat surface portion of the metallic base and the other electrode of the capacitor is connected to the terminal, and the capacitor is disposed at a vertical lateral face presented by the substrate.

The capacitor may also be disposed in a hole or recess formed in the substrate.

The infrared sensor may further comprise an insulating spacer provided between the metallic base and the substrate.

The arrangement also may be such that a protuberance is formed on the metallic base of the stem, and wherein the one of the electrodes of the capacitor is connected to the protuberance while the other electrode of the capacitor is connected to the terminal, at the upper side of the substrate.

The direct connection between one of the electrodes of the capacitor and the metallic base serves to reduce the influence of resistance and inductance generated in the portion of the grounding terminal between the substrate and the metallic base. The direct connection between the other electrode of the capacitor and the terminal by the conductive bonding material serves to reduce the influence of resistance and inductance generated in pattern electrodes. The resistance and inductance generated in the terminal connected to the other electrode of the capacitor forms, together with the capacitance of the capacitor connected in parallel therewith, a tank circuit which effectively accumulates RF noise.

The direct connection between one of the electrodes of the capacitor and the metallic base eliminates the necessity of laying a pattern electrode over a substantial length on the substrate from the capacitor electrode to the terminal that is necessary in the known art, thus contributing to a reduction in the size of the substrate. This facilitates miniaturization of the infrared sensor, and thus offers a reduction in the price of the infrared sensor.

For the purpose of illustrating the invention, there are shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, preferred embodiments of the present invention are explained in detail with reference to the drawings.

Figure 1:
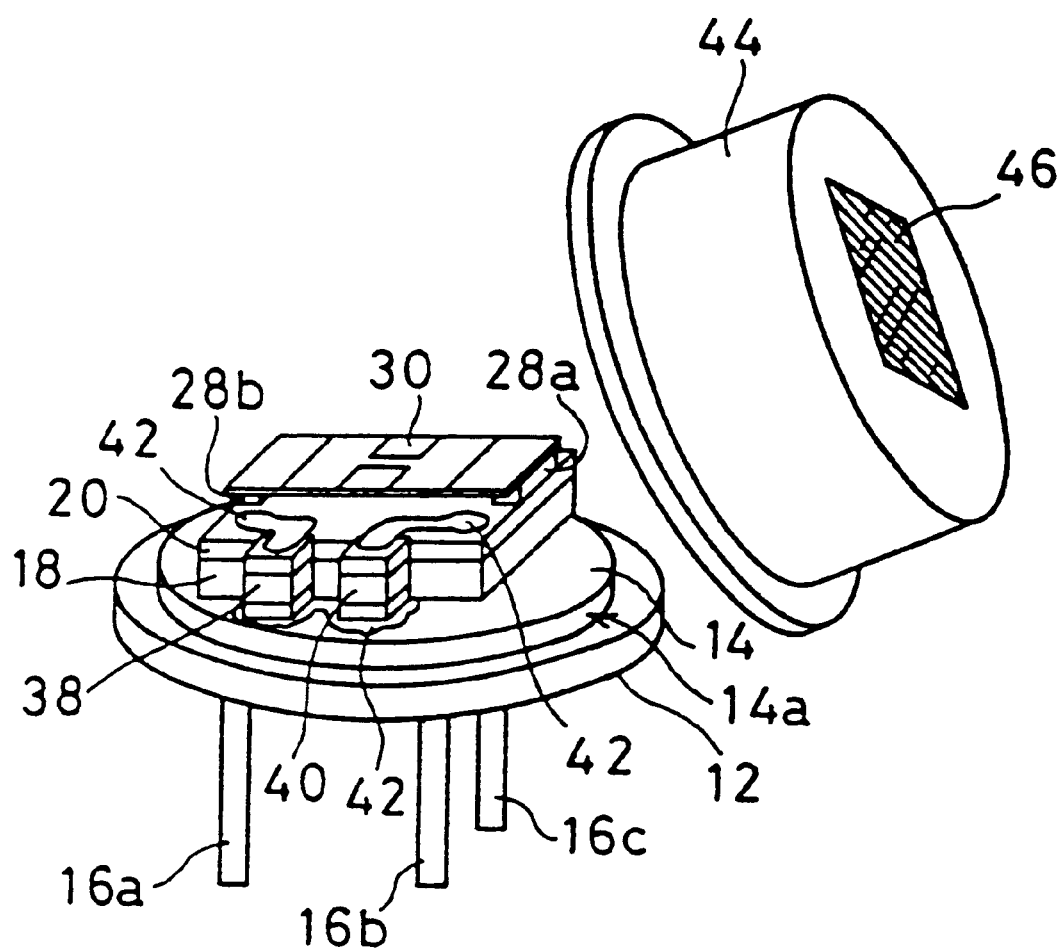
FIG. 1 is a perspective view of an embodiment of the infrared sensor in accordance with the present invention, with a cap removed therefrom.
Figure 2:
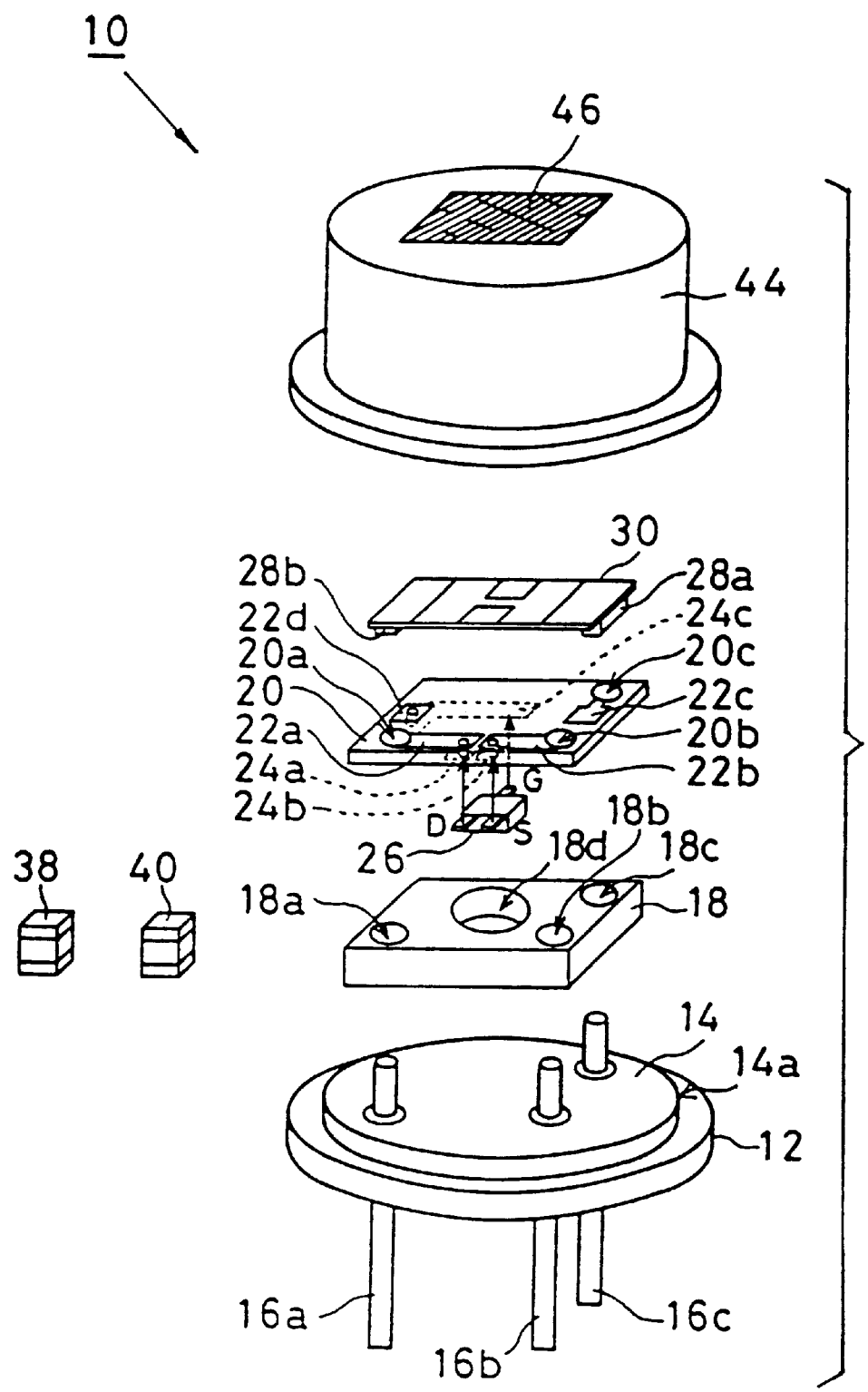
FIG. 2 is an exploded perspective view of the infrared sensor shown in FIG. 1.

FIG. 1 is a perspective view of an embodiment of the infrared sensor in accordance with the present invention, with a cap removed therefrom, while FIG. 2 is an exploded perspective view of the infrared sensor. The infrared sensor generally denoted by 10 includes a stem 12. The stem 12 has a disk-shaped metallic base 14 that is stepped as at 14a. Three through-holes are formed in the metallic base 14. These holes receive terminals 16a, 16b and 16c. Two terminals 16a, 16b among these three terminals are fixed in the holes while being insulated from the metallic base 14 by, for example, a glass, while the remainder 16c is fixed while being in electrical connection to the metallic base 14 by, for example, brazing.

A spacer 18 made of an insulating material is secured to the metallic base 14. Through-holes 18a, 18b and 18c are formed in the spacer 18 at positions corresponding to the above-mentioned three terminals 16a, 16b and 16c. The spacer 18 further has a central through hole 18d. The through-holes 18a, 18b and 18c receive the terminals 16a, 16b and 16c. A substrate 20 is placed on the spacer 18.

Through-holes 20a, 20b and 20c are formed in the substrate 20 at positions corresponding to the above-mentioned three terminals 16a, 16b and 16c. Electrodes 22a, 22b and 22c are formed on one major surface of the substrate 20, at positions adjacent to the through-holes 20a, 20b and 20c. Another electrode 22d is formed on this major surface of the substrate 20. Three electrodes 24a, 24b and 24c are formed on the other major surface of the substrate 20. The electrodes 24a and 24b are formed side-by-side and are arranged to oppose the electrodes 22a, 22b, while the electrode 24c is L-shaped and has one end that opposes the electrode 22d. The electrodes 22a and 22b formed on the first-mentioned major surface of the substrate 20 are electrically connected to the electrodes 24a and 24b on the second-mentioned major surface of the substrate 20, via through holes. Similarly, the electrode 22d on the first-mentioned major surface of the substrate 20 is connected to the electrode 24c on the second-mentioned major surface of the same, via a through-hole.

A field effect transistor (FET) 26 is attached to the second-mentioned major surface of the substrate 20. The drain D and the source S of the FET 26 are connected to the electrodes 24a and 24b, while the gate G of the same is connected to the electrode 24c. The terminals 16a, 16b and 16c are extended through the through-holes 18a, 18b and 18c of the spacer 18 and through the through-holes 20a, 20b and 20c of the substrate 20, and the FET 26 is received in the through-hole 18d formed in the spacer 18. In this state, the terminals 16a, 16b and 16c are respectively connected to the electrodes 22a, 22b and 22c.

Figure 3:
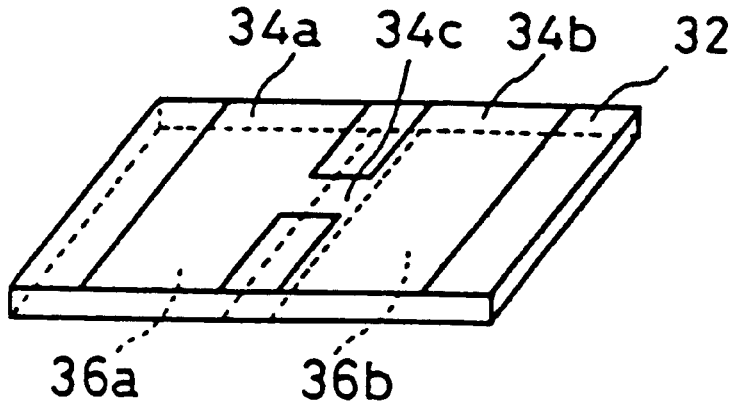
FIG. 3 is a perspective view of a pyroelectric element used in the infrared sensor of FIG. 1.

Supports 28a, 28b made of an electrically conductive material are provided on the electrodes 22c, 22d of the substrate 20, and a pyroelectric element 30 is carried by the supports 28a, 28b. As will be seen from FIG. 3, the pyroelectric element 30 has a pyroelectric substrate 32 on one major surface of which are formed a pair of electrodes 34a and 34b. These electrodes 34a and 34b are interconnected by a connecting electrode 34c, whereby a generally H-shaped electrode is formed. A pair of electrodes 36a and 36b are formed on the other major surface of the pyroelectric substrate 32, so as to oppose the electrodes 34a and 34b. The pyroelectric substrate 32 is polarized in the thicknesswise direction. The pyroelectric element 30, with the electrodes 36a and 36b serving as input and output terminals, provides a circuit equivalent to a pair of pyroelectric elements polarized in opposite directions and connected in series between these electrodes 36a and 36b. These electrodes 36a and 36b are connected to the electrodes 22c and 22d on the substrate 20, via supports 28a and 28b.

A pair of capacitors 38 and 40 are provided on a vertical surface formed by side surfaces of the spacer 18 and the substrate 20. Each of these capacitors 38 and 40 may be a known monolithic chip capacitor having external electrodes provided on both ends of a laminate structure constituted by dielectric layers and internal electrode layers stacked alternately. One external terminal of each of the capacitors 38 and 40 is bonded to the metallic base 14 by an electrically conductive adhesive 42. The other external terminal of the capacitor 38 is directly connected to the terminal 16a by the electrically conductive adhesive 42. The other external terminal of the capacitor 40 is directly connected to the terminal 16b by the electrically conductive adhesive 42.

The stem 12 is capped with a cap 44. The cap 44 is provided with a window that is sealed with an infrared-transmissive filter 46. The cap 44 fits on the step 14a of the metallic base 14.

Figure 4:
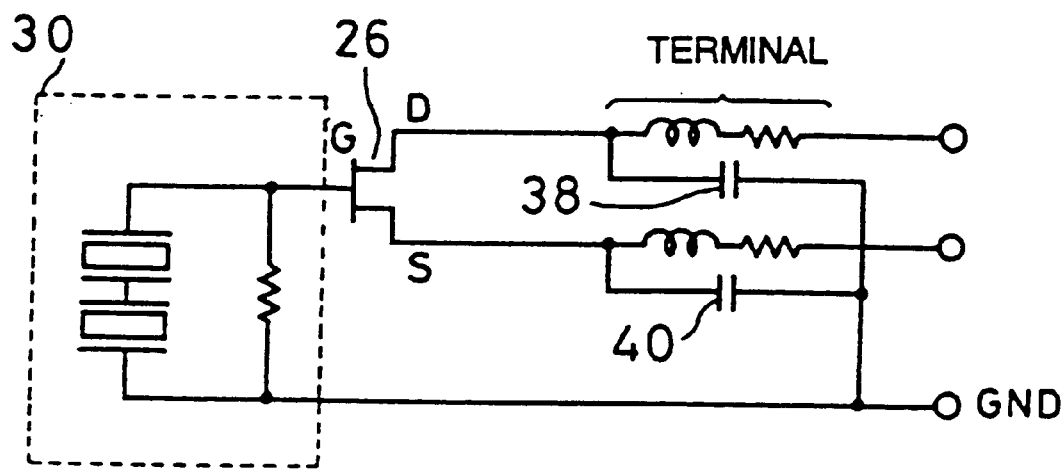
FIG. 4 is a circuit diagram showing a circuit equivalent to the infrared sensor of FIG. 1.

The infrared sensor 10 has a circuit as shown in FIG. 4. A pyroelectric current is generated in the pyroelectric element 30 when thermal energy is given to the pyroelectric element 30. The pyroelectric current is impedance-transformed by the resistance in the pyroelectric element 30 and the FET 26, so as to be output as a voltage.

In this infrared sensor 10, one of the electrodes of each of the capacitors 38 and 40 is directly bonded to the metallic base 14 of the stem 12. Therefore, no resistance nor inductance is generated between such electrode and the metallic base 14. The remaining electrodes of the capacitors 38 and 40 are directly connected to the terminals 16a and 16b by the electrically conductive adhesive 42, skipping over the electrode portions of the substrate 20, without causing generation of resistance and inductance therebetween. Consequently, resistances and inductances generated in the terminals 16a and 16b connected to the electrodes 22a and 22b are major factors that affect the characteristics of the infrared sensor 10. However, these resistances and inductances form, in combination with the capacitances presented by the capacitors 38 and 40 connected in parallel therewith, tank circuits which effectively accommodate RF noise, thus offering stable circuits for eliminating the influence of RF noise.

Figure 5:
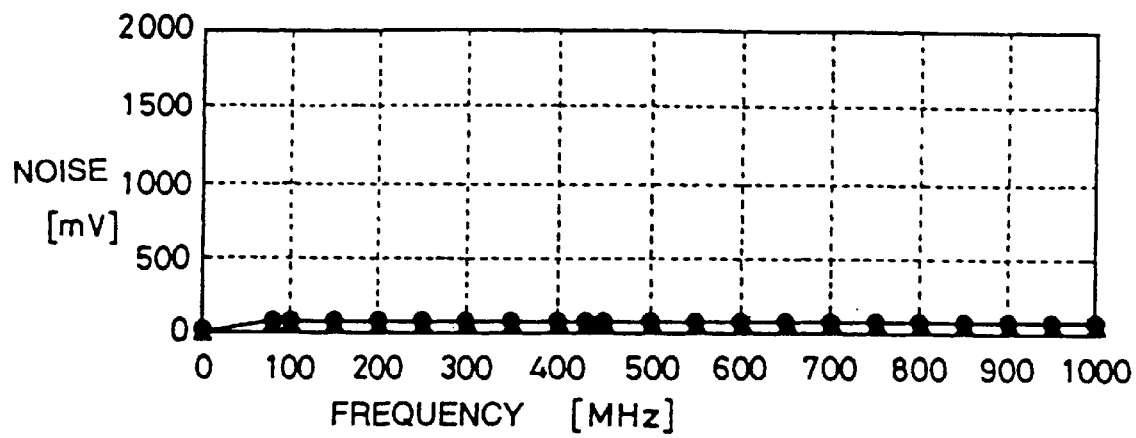
FIG. 5 is a graph showing anti-RF-noise characteristics of the infrared sensor in accordance with the present invention.
Figure 6:
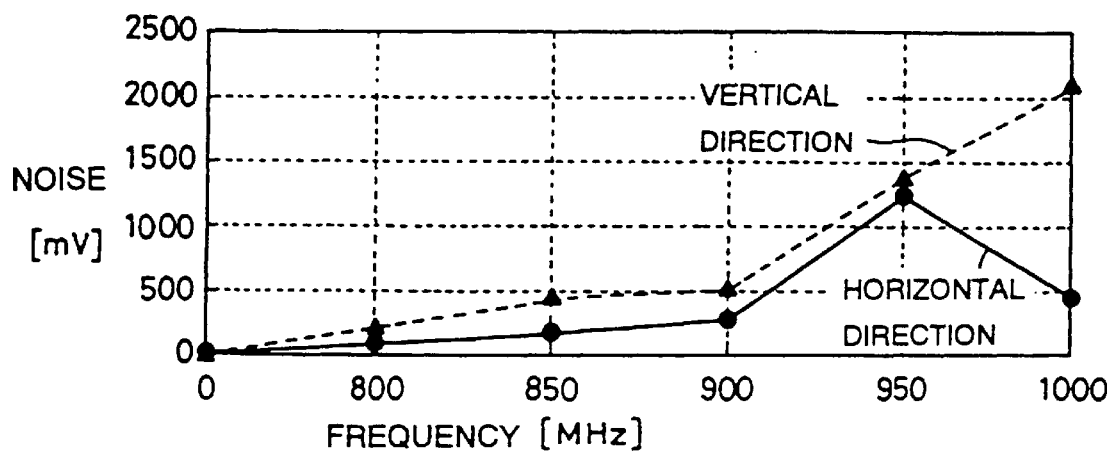
FIG. 6 is a graph showing anti-RF-noise characteristics of a known infrared sensor.

FIGS. 5 and 6 are graphs showing RF-resistance characteristics of the infrared sensor 10 as described and those of a known infrared sensor. As will be seen from these Figures, the known infrared sensor is significantly affected by noise especially at high frequencies above 900 MHz, whereas the infrared sensor 10 of the present invention is not so seriously affected by RF noise.

Thus, in the infrared sensor 10 of the present invention, the influence of resistances and inductances generated in the grounding terminal 16c and the substrate electrodes is diminished and, at the same time, the influence of RF noise is also suppressed by making an efficient use of the resistances and inductances generated in the other terminals 16a and 16b. Furthermore, the capacitors 38 and 40, that are disposed on a vertical lateral face defined by the spacer 18 and the substrate 20, can be located in the vicinity of the terminals 16a and 16b. This eliminates the necessity for the pattern electrodes to be laid-out over substantial lengths on the substrate 20 and, thus allowing the substrate 20 to have a reduced size. This facilitates miniaturization of the infrared sensor 10 and, hence, a reduction in the price of the infrared sensor 10.

Figure 7:
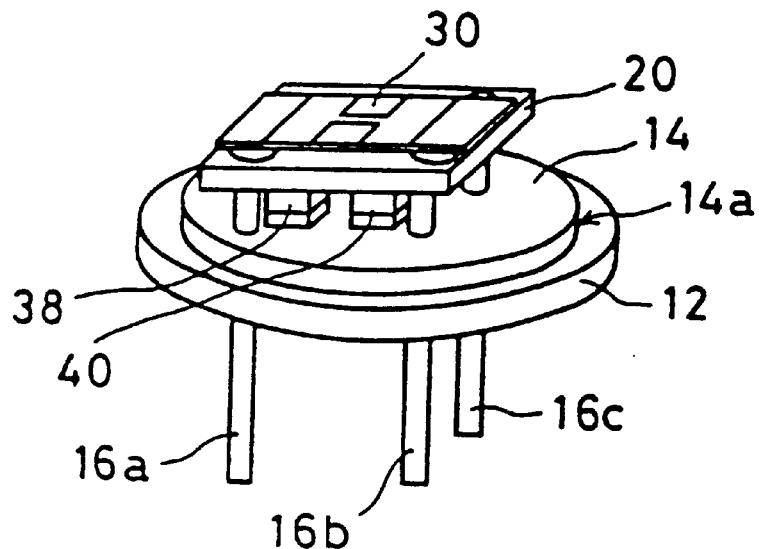
FIG. 7 is a perspective view of another embodiment of the infrared sensor in accordance with the present invention.

The infrared sensor 10 may be constructed, as shown in FIG. 7, without using any spacer. More specifically, in the infrared sensor 10 shown in FIG. 7, the substrate 20 is placed on the terminals 16a, 16b and 16c, and the capacitors 38 and 40 are placed between the underside of the substrate 20 and the metallic base 14. The capacitors 38 and 40 are directly connected to the terminals 16a and 16b at the underside of the substrate 20, by an electrically conductive adhesive.

Figure 8:
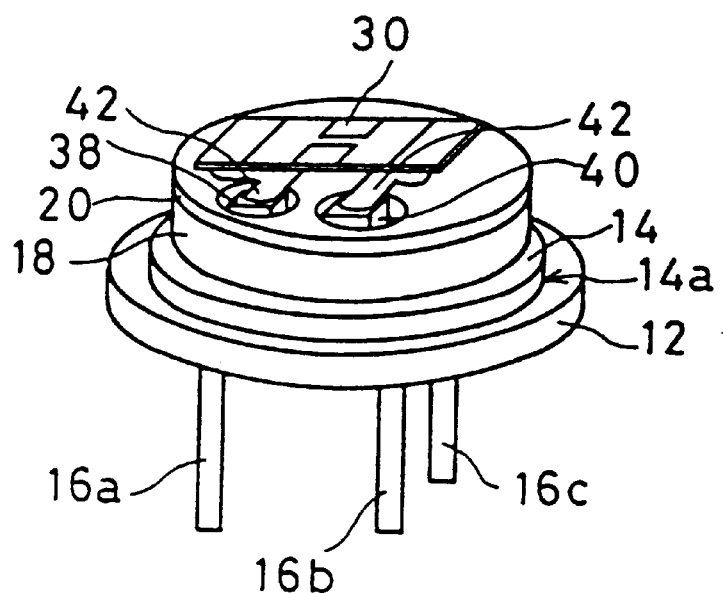
FIG. 8 is a perspective view of still another embodiment of the infrared sensor in accordance with the present invention.

The arrangement also may be such that, as shown in FIG. 8, through-holes are formed in the spacer 18 and the substrate 20 so as to receive the capacitors 38 and 40, and connections between the capacitors 38, 40 and the metallic base 14, as well as between these capacitors and the terminals 16a, 16b, are achieved in these through-holes.

Figure 9:
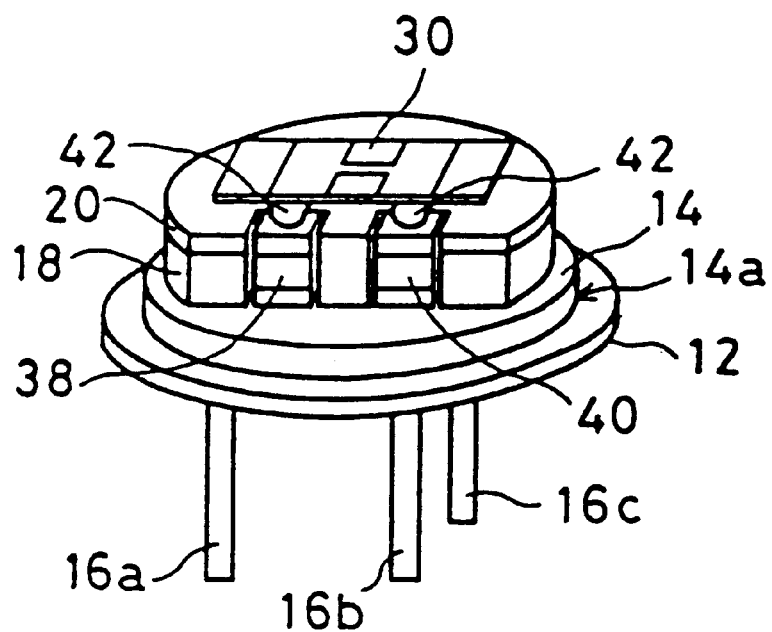
FIG. 9 is a perspective view of a further embodiment of the infrared sensor in accordance with the present invention.

The arrangement also may be such that, as shown in FIG. 9, electrical connections between the capacitors 38, 40 and the metallic base, as well as electrical connections between these capacitors and the terminals 16a, 16b, are achieved in recesses formed in the spacer 18 and the substrate 20.

Figure 10:
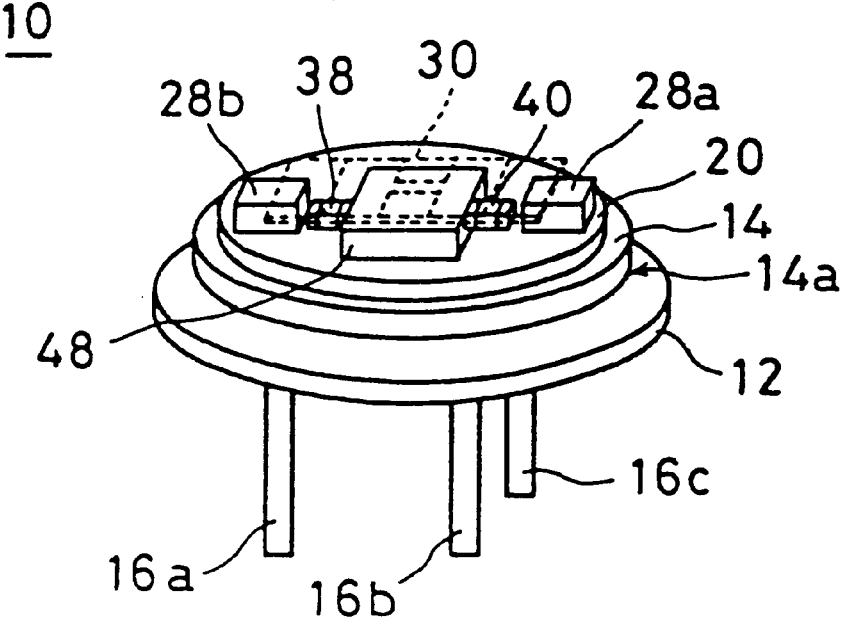
FIG. 10 is a perspective view of yet a further embodiment of the infrared sensor in accordance with the present invention.
Figure 11:
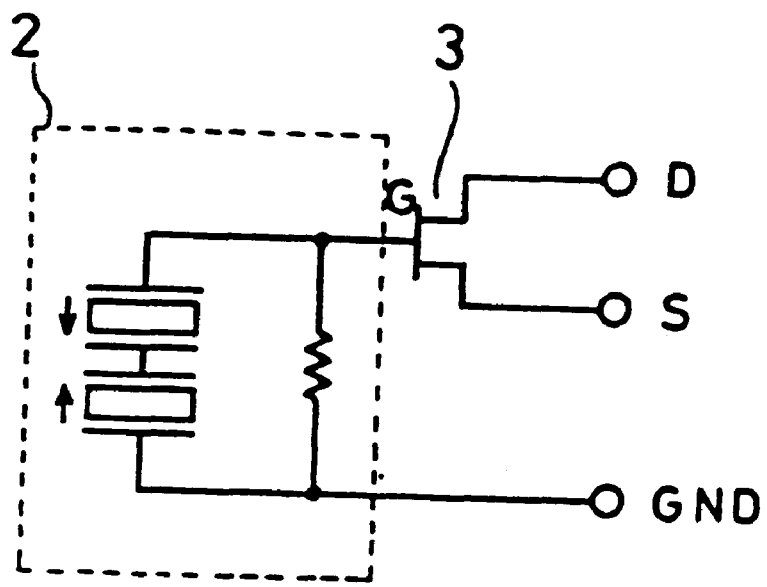
FIG. 11 is a circuit diagram showing a known ordinary infrared sensor.
Figure 12:
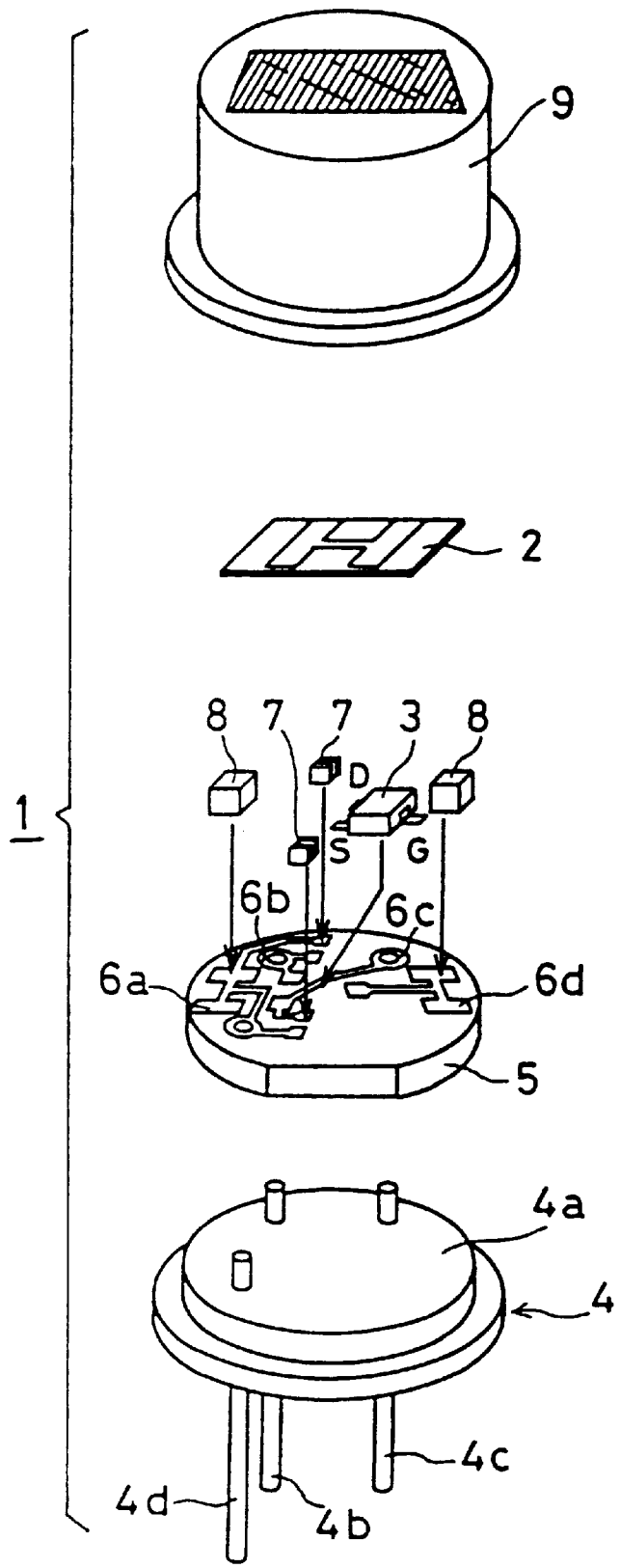
FIG. 12 is an exploded perspective view of a known infrared sensor.
Figure 13:
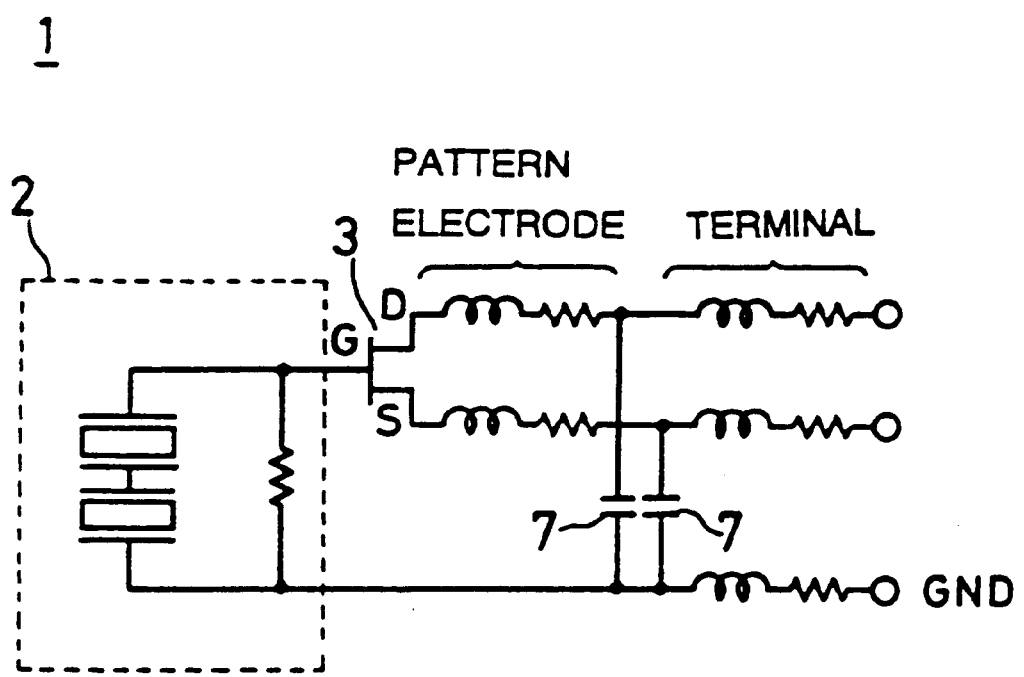
FIG. 13 is a circuit diagram showing a circuit substantially equivalent to the infrared sensor of FIG. 12.

As shown in FIG. 10, the infrared sensor of the invention may have a square or rectangular protuberance 48 formed on the metallic base 14. The protuberance 48 is received in a correspondingly configured hole formed in the substrate 20. One electrode of the capacitor 38 and one electrode of the capacitor 40 are connected to opposite surfaces of the protuberance 48. The pyroelectric element 30 is placed on the protuberance 48 and on the substrate 20 through intermediate supports 28a, 28b. Although not shown in FIG. 10, the FET 26 of this infrared sensor 10 is secured to the substrate 20.

In each of these infrared sensors 10, tank circuits are formed by the resistances and inductances formed by the terminals 16a and 16b together with the capacitances of the capacitors 38 and 40. At the same time, the influence of resistance and inductance generated in other portions of the sensor can be reduced. It is therefore possible to accumulate RF noise in the tank circuits and to reduce the size of the infrared sensor 10.

According to the present invention, it is possible to stably remove RF noise which otherwise would adversely affect the performance of the infrared sensor. The invention also facilitates miniaturization of the infrared sensor, offering a reduction in the cost of the infrared sensor.

While preferred embodiments of the invention have been disclosed, it is understood that the scope of the invention is not to be limited by the disclosed embodiments. Rather, other modes of carrying out the principles disclosed herein that might occur to a skilled individual are contemplated as being within the scope of the invention.

What is claimed is:

1. An infrared sensor, comprising:
   a metallic base serving as a ground and a ground terminal extending from said metallic base;
   a substrate disposed on said metallic base;
   a field effect transistor having gate, drain and source terminals, said field effect transistor being attached to said substrate;
   a pyroelectric element electrically connected between said gate terminal and said ground; and
   a capacitor having first and second electrodes, said capacitor being disposed on said metallic base, said first electrode being directly electrically and physically connected to said metallic base, said second electrode being directly electrically and physically connected to one of said source and drain terminals.

2. An infrared sensor according to claim 1, wherein said first electrode is connected to a flat surface portion of said metallic base.

3. An infrared sensor according to claim 1, further comprising an insulating spacer provided between said metallic base and said substrate.

4. An infrared sensor according to claim 1, wherein a protuberance is formed on said metallic base and said first electrode is electrically and physically connected to said protuberance.

5. An infrared sensor according to claim 1, wherein said first electrode is coupled to said metallic base and said second electrode is connected to said one of said drain and source electrodes by electrically conductive bonding material.

6. An infrared sensor according to claim 1, further comprising a second capacitor having first and second electrodes, said second capacitor being disposed on said metallic base, said first electrode of said second capacitor being directly electrically connected to said metallic base, said second electrode of said second capacitor being directly electrically connected to the other of said source and drain terminals.

7. An infrared sensor according to claim 1, wherein said capacitor is disposed immediately adjacent to a lateral surface defined by said substrate.

8. An infrared sensor according to claim 7, further comprising an insulating spacer provided between said metallic base and said substrate, wherein said lateral surface is defined by both said substrate and said insulating spacer.

9. An infrared sensor according to claim 7, wherein said lateral surface is substantially flat.

10. An infrared sensor according to claim 7, wherein said lateral surface is defined by a hole formed in said substrate.

11. An infrared sensor according to claim 7, wherein said lateral surface is defined by a recess formed in said substrate.

12. An infrared sensor according to claim 2, wherein said capacitor is disposed at a surface of said substrate which extends perpendicular to said flat surface portion of said metallic base.

13. An infrared sensor according to claim 1, wherein said first electrode is directly electrically and physically connected to said metallic base and said second electrode is directly connected to said one of said source and drain terminals by electrically conductive bonding material.

14. An infrared sensor according to claim 13, wherein said electrically conductive bonding material is a conductive adhesive.

15. An infrared sensor according to claim 4, wherein said protuberance extends through an opening formed in said substrate.

16. An infrared sensor according to claim 15, wherein said one of said drain and source terminals is disposed on said substrate.

17. An infrared sensor according to claim 15, wherein said metallic base has a major planar support surface and said protuberance has a side surface which extends perpendicular to said planar support surface and wherein said first electrode is physically and electrically coupled directly to said side surface of said protuberance.

* * * * *